2,896,161
MEASURING SYSTEM

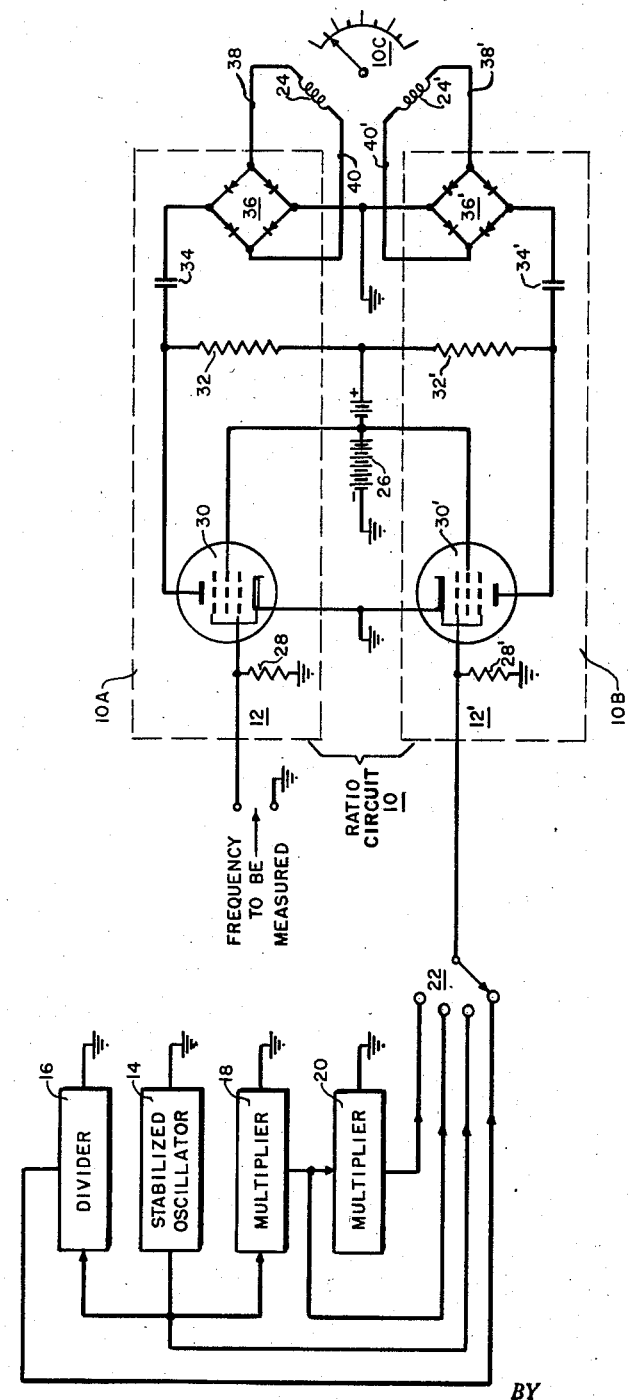
July 21, 1959  B. FOX  2,896,161
MEASURING SYSTEM
Original Filed June 30, 1942
INVENTOR.
BENJAMIN FOX

United States Patent Office 2,896,161
Patented July 21, 1959

Benjamin Fox, New York, N.Y.; Bessie E. Fox executrix of said Benjamin Fox, deceased Original application June 30, 1942, Serial No. 449,121. Divided and this application October 6, 1951, Serial No. 250,175

20 Claims. (Cl. 324—79)

(Granted under Title 35, U.S. Code (1952), sec. 266)

The invention described herein, if patented, may be manufactured and used by or for the Government for governmental purposes without the payment to me of any royalty thereon.

This application is a division of my application Serial No. 449,121, filed June 30, 1942.

My invention relates generally to an improved circuit for measuring the timing of periodic energy.

It is an object of my invention to provide a circuit for measuring the timing of periodic energy which is largely independent of changes in circuit parameters and ambient operating conditions.

It is another object of my invention to provide an improved frequency indicating circuit which provides an indication which is proportional to the ratio of the frequency to be measured and a stabilized reference frequency.

It is a further object of my invention to provide a circuit of the above type in which a plurality of frequency-stabilized reference potentials, which are preferably harmonically related, are utilized to provide a like plurality of frequency indication ranges.

The features of my invention which I believe to be novel are set forth with particularity in the appended claims. My invention, itself, however, both as to its organization and method of operation, together with further objects and advantages thereof, may best be understood by reference to the following description taken in conjunction with the accompanying drawing in which the single figure is a schematic circuit diagram of one embodiment of my invention.

In general, the invention comprises a network 10 having an indicator 10C which will provide an indication proportional to the frequencies of two alternating currents respectively applied to the terminals of input circuits 12 and 12' of the network. To input circuit 12 there is applied the potential the frequency of which is to be measured, while to input circuit 12' there is applied a frequency-stabilized reference current. The source of reference current is preferably derived from an oscillator 14 the frequency of which is preferably stabilized, as by a piezo crystal. A frequency divider 16 and a pair of cascade-connected frequency multipliers 18 and 20 may also be connected to oscillator 14 to provide a plurality of frequency-stabilized, harmonically-related potentials any of which can be selectively connected to the terminals of the input circuit 12'. To this end, the outputs of elements 14—20 are connected to the stationary contact points of a selector switch 22, the movable contact of which is connected to one of the terminals of input circuit 12', the return circuit being through the ground connection. By the use of such harmonically related reference frequencies, meter 10C will indicate a plurality of harmonically related frequency ranges, four in this particular case, the reading of one range being an integral multiple of the reading of the others. Either a separately calibrated scale may be used for each range, or one scale, such as shown, may be used, and the reading thereon multiplied by the appropriate integer determined by the reference frequency selected by switch 22. The scale of indicator 10C is calibrated to indicate directly the frequency of the source of current connected to terminals 12 in absolute terms.

The system above described affords several advantages. By providing a measuring network which affords an indication proportional to the ratio of two frequencies, it is possible to make the accuracy of the indication largely independent of changes in the circuit parameters and components of the network due to aging and changes in ambient operating conditions, as will appear hereinafter. Further, by changing the frequency of the reference current, the frequency indication range can be easily changed, and by providing a plurality of harmonically related reference frequency currents, a plurality of integrally related frequency indication ranges can be provided.

An example of a suitable type of ratio circuit that can be used in network 10 will now be described, although any other type may be utilized. Network 10 comprises two identically constructed counter circuits shown in broken line boxes 10A and 10B each of which supply a direct current output which is substantially directly proportional to the frequency of the current applied to its input. The output currents are respectively applied to the two inputs of a ratio meter 10C, which in this case is of the conventional cross-coil type. This meter comprises two coils 24 and 24' having their axes perpendicular to each other, and respectively connected to the outputs of counters 10A and 10B. The meter pointer therefore assumes a position having an angle determined by the resultant field produced by the two coils, which is proportional to the ratio of the currents in the coils, which are, in turn, proportional to the frequencies of the currents applied to the inputs of counters 10A and 10B.

Both counters are energized by the same potentials from a source of D.-C. potential, such as 26. Since both counters are identical in construction, the specific circuit of only counter 10A will be described. The current impressed on input circuit 12 is impressed across a resistance 28 connected between the control grid and the grounded cathode of an electron tube 30, which may be of the pentode type. The source of direct current potential 26 has its negative terminal connected to the cathode and its positive terminal connected in series with a high resistance 32 to the anode of tube 30. The screen grid of the tube is connected to an intermediate point on the D.-C. voltage source 26, while the suppressor grid is connected to the cathode. The junction of the anode and resistance 32 is connected to one terminal of a storage condenser 34, the other terminal of which is connected to one of the input terminals of a full-wave rectifier 36. The other input terminal of the rectifier is connected to the cathode and the negative terminal of battery 26 through the ground connection. The output leads 38 and 40 of the rectifier are connected to coil 24 of meter 10C.

The circuit thus far described operates as follows: Each cycle of potential applied to input circuit 12 alternately drives tube 30 to cutoff and to full conducting condition. When the tube is at cutoff, condenser 34 is fully charged from battery 26 through resistance 32, rectifier 36 and coil 24, the return circuit to the battery being through ground. When tube 30 is conducting, condenser 34 is completely discharged through the tube, rectifier 36 and coil 24. Because rectifier 36 is of the full wave type, both the charge and discharge currents of the condenser pass through coil 24 in the same direction. The above cycle is repeated at every cycle of the current applied to the counter. Since the number of times per second that condenser 36 is completely charged and discharged is proportional to the frequency of the current in the counter input, it will be seen that the current in coil 24 will be proportional to the frequency. Circuits of this type are largely independent of the wave form of the input wave.

The elements of counter 10B which are the same in structure and function as those of counter 10A bear the same reference numerals with a prime mark added to them. Counter 10B supplies a direct current to coil 24' which is proportional to the frequency of the reference frequency current applied to circuit 12'.

In a counter circuit such as above described, the output current will not only be dependent upon the frequency, but also upon the circuit parameters, such as the voltage of battery 26 and the capacity of condenser 34, which are likely to vary over a wide range due to aging and changes in ambient operating conditions, such as temperature, humidity, etc. To provide accuracy in calibration it has heretofore been necessary to provide more or less complicated means regulating apparatus for maintaining the parameters constant.

In accordance with my invention the need for maintaining such constancy is eliminated. Since both counters 10A and 10B have identical components, the characteristics of which vary in the same manner due to aging and changes in ambient operating conditions, and since they are energized by the same sources of potential such as battery 26, the variation of the currents in both meter coils 24 and 26 will be proportional to these changes in operating conditions and hence the ratio indication will not be affected and will at all times be substantially proportional solely to the ratio of the input frequencies.

It is to be understood that the specific frequency ratio indicating network described herein is for purpose of illustrating the principles of my invention. Obviously, the invention, in its broad aspects, can utilize any other suitable type of ratio network. Although the invention has been described with reference to frequency measurement, it can be used to measure any other timing characteristic of a wave.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A frequency measuring system comprising first and second input circuits, means for impressing upon said first circuit a periodic potential the frequency of which is to be measured, a source of frequency stabilized periodic potential, and means for impressing the output of said source upon said second circuit, and calibrated indicating means coupled to said circuits to provide an indication which is substantially proportional to the ratio of the frequencies of said periodic potentials.

2. A frequency measuring system as set forth in claim 1, wherein said source comprises means for generating a plurality of periodic potentials having harmonically-related frequencies, and selecting means for selecting one of said potentials and impressing it upon the second circuit, thereby providing a plurality of frequency ranges for said indicating means, one range being an integral multiple of the other.

3. A frequency measuring system as set forth in claim 1, wherein said indicating means comprises counter means and an indicator controlled by said counter means.

4. A frequency measuring system as set forth in claim 3, wherein said counter means comprises a capacitor and means for charging and discharging said capacitor during each cycle of periodic potential, and wherein said indicator comprises means responsive to the charge and discharge currents.

5. A frequency measuring system comprising first and second input circuits, means for impressing upon said first circuit a periodic potential the frequency of which is to be measured, means for generating a plurality of periodic potentials having harmonically-related frequencies, selecting means for selecting one of said potentials and impressing it upon the second circuit, and ratio-responsive indicating means coupled to said circuits to provide an indication which is proportional to the ratio of the frequencies of the periodic potentials impressed thereon, said indicating means being calibrated to indicate directly the frequency of the potential impressed upon said first circuit.

6. A system for measuring the timing of a periodic potential comprising a circuit upon which said potential is impressed, a source of periodic reference potential the frequency of which is stabilized; and means including counter means coupled to said circuit and said source and calibrated indicating means coupled to said counter means to provide an indication substantially proportional to the ratio of the frequencies of said potentials.

7. A system for measuring the frequency of a periodic potential comprising a ratio meter having two operating elements, first means adapted to be excited by said potential and including a source of D.-C. voltage for deriving from said potential a first energy component whose magnitude is dependent upon the frequency of said potential and the magnitude of said voltage, second means including the same source of voltage for deriving a second energy component whose magnitude is dependent upon the magnitude of said voltage, and means for supplying said first and second energy components, respectively, to said two operating elements, whereby variations in the magnitude of said voltage are prevented from affecting the indication of said ratio meter, said ratio meter including means responsive to said operating elements for indicating progressively the numerical value of the ratio of the magnitudes of said first and second energy components.

8. A system for measuring the frequency of a periodic potential comprising a ratio meter having two operating elements, first means adapted to be excited by said potential and including a source of D.-C. voltage for deriving from said potential a first energy component whose magnitude is dependent upon the frequency of said potential and the magnitude of said voltage, means including the same source of voltage and a source of periodic reference potential for deriving a second energy component dependent upon the frequency of said reference potential and the magnitude of said voltage, and means for supplying said first and second energy components, respectively, to said two operating elements whereby variations in the magnitude of said voltage are prevented from affecting the indication of said ratio meter.

9. A frequency-ratio measuring system comprising a ratio meter having two operating elements, first means adapted to be excited by a first periodic potential and including a source of D.-C. voltage for deriving from said potential a first energy component whose magnitude is dependent upon the frequency of said periodic potential and the magnitude of said voltage, second means including the same source of voltage and adapted to be excited by a second periodic potential for deriving a second energy component whose magnitude is dependent upon the magnitude of said voltage and the frequency of said second periodic potential, and means for supplying said first and second energy component, respectively, to said two operating elements, whereby variations in the magnitude of said voltage are prevented from affecting the indication of said ratio meter.

10. A frequency sensitive system for translating a periodically varying potential comprising a ratio indicating means having two operating circuits, means controlled by said potential for deriving energy whose magnitude depends upon the frequency of said potential, means for impressing said energy upon one of the said circuits, a source of periodic reference potential independent of the first-mentioned potential, means controlled by said source of periodic reference potential for deriving reference energy whose magnitude depends upon the frequency of said reference potential, and means for impressing upon the other circuit said reference energy.

11. A translating system responsive to two periodic potentials comprising a frequency sensitive circuit adapted to be energized by one of said potentials, a second frequency sensitive circuit adapted to be energized by the other of said potentials, both of said circuits having substantially identical operating parameters and each adapted to produce an electrical output which is substantially proportional to the frequency of its controlling potential, and means coupled to the outputs of said frequency responsive circuits to produce an effect which is substantially proportional to the ratio of said outputs.

12. A network as set forth in claim 11, wherein said frequency sensitive circuits are counting circuits, the components of each of which include at least one electron tube having an electrode adapted to be excited by one of said periodic potentials, an energy storing means coupled to said electron tube and means responsive to each cycle of periodic potential on said electrode to store a fixed quantity of energy in said storing means, like components of both counting circuits having substantially identical characteristics which vary in the same manner in response to changes in ambient operating conditions.

13. A frequency comparing circuit for two alternating voltages comprising two cycle counting circuits respectively adapted to be controlled by said voltages, and an electrodynamic element excited by the outputs of both circuits and responsive to the ratio of said outputs.

14. A stable frequency responsive network for producing an effect dependent on the frequency of a periodic phenomenon comprising a frequency responsive circuit adapted to be controlled by said phenomenon, a source of frequency stabilized alternating voltage, a second frequency responsive circuit controlled by said source, both of said circuits having substantially identical characteristics and adapted to produce an output which is substantially proportional to the frequency of its controlling means, and means excited by and responsive to substantially the ratio of the outputs of said frequency responsive circuits.

15. An arrangement for measuring the frequency of electrical waves comprising a ratiometer having two operating coils, means for deriving from the said waves an electric current whose magnitude depends upon the said frequency, means for supplying the said current to one of the said coils, means for supplying a reference current included in said first-mentioned means to the other coil whereby variations of said current caused by variations of said reference current acting on said first-mentioned means are prevented from affecting the indication of said ratiometer, said means for deriving the said electric current comprising a counting circuit operated from a source of voltage and adapted to produce a current proportional to the frequency of the waves applied thereto, and further including means for deriving the said reference current from the said source of voltage.

16. A system as set forth in claim 6, wherein said source comprises means for generating a plurality of potentials of different frequencies and means for selecting any of said potentials and impressing it on said counter, thereby providing a plurality of measurement ranges on said indicating means.

17. A system as set forth in claim 10, wherein said source of periodic reference potential comprises means for providing a plurality of potentials having different frequencies and means for selecting one of said potentials for use as a reference potential.

18. A system as set forth in claim 10, wherein said source of periodic reference potential comprises a crystal controlled oscillator and means coupled to said oscillator for deriving a plurality of potentials having different harmonically related frequencies.

19. A frequency comparing circuit as set forth in claim 13, wherein like components of both cycle counting circuits have substantially identical characteristics which vary in the same manner in response to changes in ambient operating conditions.

20. A translating system as set forth in claim 11, wherein both frequency sensitive circuits comprise components having substantially identical values which vary in the same manner in response to changes in ambient operating conditions.

References Cited in the file of this patent

UNITED STATES PATENTS

| | | |
|---|---|---|
| 1,669,524 | Kintner | May 15, 1928 |
| 1,695,264 | Adams | Dec. 18, 1928 |
| 1,902,496 | Fitz Gerald | Mar. 21, 1933 |
| 2,104,801 | Hansell | Jan. 11, 1938 |
| 2,176,742 | Pierre | Oct. 17, 1939 |
| 2,208,349 | Ulbright | July 16, 1940 |
| 2,213,099 | Adorjan | Aug. 27, 1940 |
| 2,284,850 | Smith | June 2, 1942 |